United States Patent
Eisenbarth

(10) Patent No.: US 12,265,152 B2
(45) Date of Patent: Apr. 1, 2025

(54) OBJECT TRACKING METHOD

(71) Applicant: Conti Temic microelectronic GmbH, Nuremberg (DE)

(72) Inventor: Andreas Eisenbarth, Hergatz (DE)

(73) Assignee: Conti Temic microelectronic GmbH, Nüremberg (DE)

( * ) Notice: Subject to any disclaimer, the term of this patent is extended or adjusted under 35 U.S.C. 154(b) by 262 days.

(21) Appl. No.: 17/753,954

(22) PCT Filed: Jul. 15, 2020

(86) PCT No.: PCT/DE2020/200058
§ 371 (c)(1),
(2) Date: Mar. 18, 2022

(87) PCT Pub. No.: WO2021/052542
PCT Pub. Date: Mar. 25, 2021

(65) Prior Publication Data
US 2022/0334246 A1 Oct. 20, 2022

(30) Foreign Application Priority Data
Sep. 20, 2019 (DE) ...................... 10 2019 214 383.0

(51) Int. Cl.
*G01S 13/931* (2020.01)
*G01S 13/72* (2006.01)

(52) U.S. Cl.
CPC ............ *G01S 13/931* (2013.01); *G01S 13/72* (2013.01)

(58) Field of Classification Search
CPC ................................ G01S 13/931; G01S 13/72
See application file for complete search history.

(56) References Cited

U.S. PATENT DOCUMENTS

| 4,079,376 A | 3/1978 | Kirk, Jr. |
| 5,313,212 A | 5/1994 | Ruzicka |

(Continued)

FOREIGN PATENT DOCUMENTS

| CN | 105549021 A | 5/2016 |
| CN | 106097388 A | 9/2016 |

(Continued)

OTHER PUBLICATIONS

Notice of Reasons for Refusal drafted Sep. 29, 2023 for the counterpart Japanese Patent Application No. 2022-512440 and translation of same.

(Continued)

*Primary Examiner* — Peter M Bythrow
*Assistant Examiner* — Nazra Nur Waheed

(57) ABSTRACT

An object tracking method, in which a radar sensor emits radar signals in successive measurement cycles, said radar signals being reflected by the object and captured by the radar sensor as radar targets, wherein movement information about the object for object tracking is determined on the basis of the radar targets and a search window for the radar targets of the object is defined on the basis of the movement information, wherein the search window is widened if a change in the movement information which exceeds a definable limit value is determined in successive measurement cycles and/or if no radar targets of the tracked object are captured anymore.

11 Claims, 2 Drawing Sheets

(56) References Cited

U.S. PATENT DOCUMENTS

| | | | |
|---|---|---|---|
| 2008/0231498 A1* | 9/2008 | Menzer | G01S 13/765 342/134 |
| 2011/0234448 A1 | 9/2011 | Hayase | |
| 2015/0353081 A1 | 12/2015 | Kaminade et al. | |
| 2017/0097412 A1 | 4/2017 | Liu | |
| 2017/0349178 A1 | 12/2017 | Suzuki | |
| 2017/0356990 A1 | 12/2017 | Asanuma | |
| 2018/0118205 A1 | 5/2018 | Minemura et al. | |
| 2018/0252804 A1 | 6/2018 | Bilik | |
| 2019/0179002 A1* | 6/2019 | Takayama | G01S 13/726 |

FOREIGN PATENT DOCUMENTS

| | | |
|---|---|---|
| CN | 109901122 A | 6/2019 |
| DE | 102011001248 A1 | 9/2012 |
| DE | 102018104090 A1 | 9/2018 |
| DE | 112017004021 T5 | 5/2019 |
| FR | 3041438 A1 | 3/2017 |
| JP | 2000171551 A | 6/2000 |
| JP | 2008195140 A | 8/2008 |
| JP | 2013117475 A | 6/2013 |
| JP | 2019144094 A | 8/2019 |

OTHER PUBLICATIONS

Notice of Reasons for Refusal drafted Mar. 8, 2023 for the counterpart Japanese Patent Application No. 2022-512440 and Global Dossier Translation of same.

German Search Report dated May 29, 2020 for the counterpart German Application No. 10 2019 214 383.0.

The International Search Report and the Written Opinion of the International Searching Authority mailed on Nov. 11, 2020 for the counterpart PCT Application No. PCT/DE2022/000058.

Office Action dated Aug. 23, 2024 from corresponding Chinese patent application No. 202080065309.2.

* cited by examiner

OBJECT TRACKING METHOD

CROSS-REFERENCE TO RELATED APPLICATIONS

The present application is a National Stage Application under 35 U.S.C. § 371 of International Application No. PCT/DE2020/200058 filed on Jul. 15, 2020, which claims priority from German Patent Application No. 102019214383 filed on Sep. 20, 2019, in the German Patent and Trade Mark Office, the disclosures of which are herein incorporated by reference in their entireties.

BACKGROUND

1. Field

The present application relates to an object tracking and accident recognition method, in particular a computer-implemented method, by means of a radar sensor of an assistance system or driver assistance system as well as a driver assistance system, in which object tracking and accident recognition are effected in particular on the basis of the method, a computer program for performing the method, and a transportable computer-readable storage medium on which the computer program for performing the method is stored.

2. Description of Related Art

Modern means of transportation such as motor vehicles or motorcycles are increasingly being equipped with driver assistance systems which, with the aid of suitable sensor technology or sensor systems, can capture the surroundings, recognize traffic situations and support the driver, e.g., by means of a braking and/or steering intervention or by outputting a visual, haptic or acoustic warning. Radar sensors, lidar sensors, camera sensors, ultrasonic sensors or the like are regularly deployed as sensor systems for capturing the surroundings. Conclusions regarding the surroundings can subsequently be drawn from the sensor data determined by the sensors. The capturing of the surroundings by means of radar sensors is based, e.g., on the emission of bundled electromagnetic waves and their reflection by objects, e.g., other road users, obstacles on the road or the peripheral development of the road. The individual reflections or detections associated with an object are captured as so-called radar targets by the radar sensor and are assigned, e.g., by a suitable algorithm to the corresponding object. Such objects can be observed or tracked in a tracking manner, wherein the object tracking should take place completely, i.e., a tracked object should not be lost, e.g., as a consequence of a so-called "track break", as this can lead to erroneous conclusions or incorrect interpretation of the traffic scene. This can in turn lead to the driver assistance system of the ego vehicle not intervening in the situation, e.g., by braking, or only doing so too late to prevent a rear-end collision.

One of the most complex situations that can occur for driver assistance systems is an accident situation involving a vehicle driving in front. For example, a vehicle driving in front runs into an obstacle, wherein the ego vehicle is not yet affected in this situation. However, this represents an increased hazardous situation for the ego vehicle, as the movement state of the vehicle driving in front involved in the accident changes very quickly, to which the ego vehicle must react. It is true that the dynamic range of the tracking algorithms saved in the driver assistance system can be adapted, however the dynamics that occur in such a situation represent extreme cases that can lead to track breaks so that the desired continuity of the captured object is interrupted.

For example, the following problems can arise for tracking algorithms for accident situations involving objects driving in front: the situation often occurs spontaneously, i.e., without prior warning, so that the tracking algorithm cannot adjust to the situation in order to react accordingly. Furthermore, the physical quantities occurring during an accident can exceed the physical quantities during the normal flow of traffic many times over.

A method for supporting a driver of a motor vehicle having a driver assistance system is known from DE 10 2011 001 248 A1, in which movement information about an object is captured by means of a radar measuring device, said movement information being used to tracks objects. This poses the problem that some movement parameters such as, for instance, the relative acceleration, cannot be measured by the radar measuring device or inaccurate object models exist, as a result of which object losses can occur. If a further detection occurs, a new object is then initialized although this measured value originates from the object that has already been tracked. Such measurement situations occur in particular if the measurement values are too far removed from the position predicted by the object model. The loss of an object as a consequence of a sudden change in acceleration constitutes a not insignificant problem for generic assistance functions. Such situations with high dynamics are very relevant especially in applications to avoid accidents. Losing an object and re-initializing then mean losing valuable fractions of a second. In order to solve this problem, it is suggested that item information be captured in the environment of the motor vehicle by means of a camera so that the object tracking is improved by using the captured item information in order to correct the object tracking. However, this requires additional hardware outlay (camera as well as the activation thereof) and computational cost (data fusion and correction calculations) and does not eliminate the "weak points" of the radar measuring device.

SUMMARY

Embodiments of the present application relate to an improved object tracking and accident recognition method as well as a corresponding assistance system, in which the disadvantages from the prior art are overcome and the object tracking is improved in a simple and inexpensive manner.

According to an embodiment, in a tracking method, a radar sensor emits radar signals in multiple successive measurement cycles, said radar signals subsequently being reflected by the object and captured by the radar sensor as radar targets. Movement information about the object for object tracking is then determined on the basis of the radar targets, wherein a search window for the radar targets of the object is defined by the movement information. The search window is widened if a change in the movement information which exceeds a definable threshold is determined in successive measurement cycles and/or if no radar targets of the tracked object are captured anymore. This results in the advantage that the tracked object remains continually captured, i.e., no track breaks occur, as a result of which the tracked object would be lost, which would lead to undesired control interventions, e.g., in an ego vehicle.

The speed and/or the acceleration of the object is/are preferably utilized as the movement information. This information is usually already established in generic radar sensors or driver assistance systems comprising radar sensors so that no additional or only insignificant hardware outlay and/or computational cost is/are required. For example, the search window can consequently be widened with respect to the speed, e.g., by widening the speed search window from 1-2 m/s (in the initial condition) to at least 5 m/s, preferably to 7 m/s, in particular to 10 m/s. Correspondingly, the threshold of the movement information can also be defined as a determined speed difference between two measurement cycles of more than 1 m/s, preferably more than 3 m/s, in particular more than 5 m/s.

Following the widening of the search window, the current measurement cycle can expediently either be repeated or the following measurement cycle can be started.

According to an embodiment, movement information patterns are saved for object tracking, e.g., in a memory of the vehicle or a control of a driver assistance system. As a result, the object and/or a traffic situation can be classified by, e.g., carrying out an alignment or comparison of the captured movement information about the object and the saved movement information patterns. The movement information patterns are, in particular, specific details, parameters and/or variables which allow conclusions to be drawn about an object class (e.g., vehicle involved in an accident) or a specific traffic scenario. For example, in the event of a vehicle driving in front changing speed suddenly and significantly, e.g., dropping from 50 km/h to 0 km/h within a few seconds, and a correspondingly suddenly ending and significantly shortened trajectory, an accident scenario can be concluded. Consequently, an accident hypothesis can be substantiated by capturing such a traffic situation so that the respective vehicle can be classified as a vehicle involved in an accident.

Furthermore, radar targets which have been captured in the widened search window can be assigned to the object if said radar targets correspond to a movement information pattern.

The widening of the search window can expediently be canceled if no radar targets of the widened search window can be assigned to the object in a definable number of measurement cycles.

The widening of the search window is preferably restricted to a definable number of measurement cycles, e.g., for the following three, in particular the following five, in particular the following ten measurement cycles or the like.

According to an embodiment, the acceleration of the object is determined on the basis of a difference quotient from the speed and assigned to the object. As a result, the high dynamics of an object involved in an accident or vehicle involved in an accident can, for example, be reported to the ego vehicle since the very high acceleration is transferred directly to the object involved in the accident as a property via the difference quotient without filtering.

Furthermore, means can be provided, with which the movement information about the object, the classification of the object and/or the classification of the traffic situation can be forwarded or sent. This results in the advantage that a vehicle classified as an object involved in an accident or an accident situation is notified via an interface, e.g., radio transmission or the like, to other road users (in particular Car-2-Car communication or Car-to-X communication) so that these can also react accordingly to the situation (e.g., braking, accelerating, evasive maneuvers, new planning of trajectories, making emergency calls, sending visual, acoustic and haptic warnings and the like).

The classification can expediently be restricted to a definable region of the movement information.

A plausibility check of the determined movement information and/or of the classification of the object and/or of the classification of the traffic situation on the basis of multiple measurement cycles is preferably provided, e.g., three, five, ten measurement cycles or the like.

Furthermore, according to an embodiment, there is provided a driver assistance system which performs an object tracking in particular on the basis of the method according to the present application. To this end, the driver assistance system has a radar sensor for object tracking, which emits radar signals in successive measurement cycles, said radar signals being reflected by the object to be tracked and captured by the radar sensor as radar targets. Movement information about the object, such as, e.g., the speed and/or acceleration, for object tracking can then be determined on the basis of the radar targets. A search window for the radar targets of the object is defined by the movement information. For example, the search window can be defined on the basis of the speed of the object in such a way that the object would also have to be located within this search window in the following measurement cycles for the predicted progressive movement or trajectory. In the event that a change in the movement information that exceeds a definable limit value (e.g., falls below or exceeds a definable speed or change in speed) is determined in successive measurement cycles, and/or suddenly no radar targets or detections for the tracked object can be captured anymore, the search window is widened.

The radar sensor is preferably a sensor which detects objects on the basis of emitted electromagnetic waves which are reflected by the objects and are received again. The electromagnetic waves can have different wave and frequency ranges. For example, the electromagnetic waves can lie in a wavelength range of 1 mm to 10 km or frequency range of 300 GHz to 30 kHz, preferably in a wavelength range of 1 cm to 1000 m or frequency range of 30 GHz to 300 kHz, preferably in a wavelength range of 10 cm to 100 m or frequency range of 3 GHz to 3 MHz, particularly preferably in a wavelength range of 1 m to 10 m or frequency range of 300 MHz to 30 MHz. Furthermore, the electromagnetic waves can also lie in a wavelength range of 10 nm to 3 mm or frequency range of 30 PHz to 0.1 THz, preferably in a wavelength range of 380 nm to 1 mm or frequency range of 789 THz to 300 GHz, preferably in a wavelength range of 780 nm to 1 mm or frequency range of 385 THz to 300 GHz, particularly preferably in a wavelength range of 780 nm to 3 μm or frequency range of 385 THz to 100 THz.

Furthermore, according to an embodiment, there is provided a computer program having program code for performing the method according to the present application if the computer program is executed in a computer or another programmable data processor known from the prior art. Hence, the method can also be configured as a purely computer-implemented method, wherein the term "computer-implemented method" within the meaning of the present application describes a sequencing or procedure which is realized or performed on the basis of a data processor. The data processor such as, e.g., a computer, a computer network or another programmable device known from the prior art (e.g., a computing device comprising a processor, microcontroller or the like) can process data by means of programmable calculation specifications. With respect to the method, essential properties can be brought about, e.g., by a new program, new programs, an algorithm or the like.

In addition, according to an embodiment, there is provided a computer-readable storage medium which comprises instructions which prompt the computer, on which they are executed, to perform a method according to at least one of the preceding claims.

The embodiments may include combinations of features of the features or claims which are not explicitly indicated, so-called sub-combinations.

BRIEF DESCRIPTION OF THE DRAWINGS

The embodiments are explained in greater detail below with reference to the accompanying drawings, in which.

Figure 1:
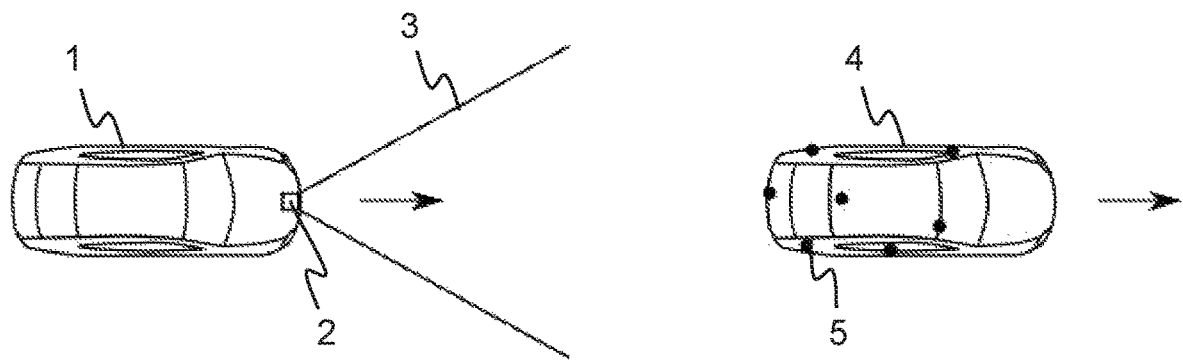
FIG. 1 shows a simplified schematic representation of a traffic situation in which an ego vehicle follows a vehicle driving in front and tracks it by means of suitable sensor technology.
Figure 2:
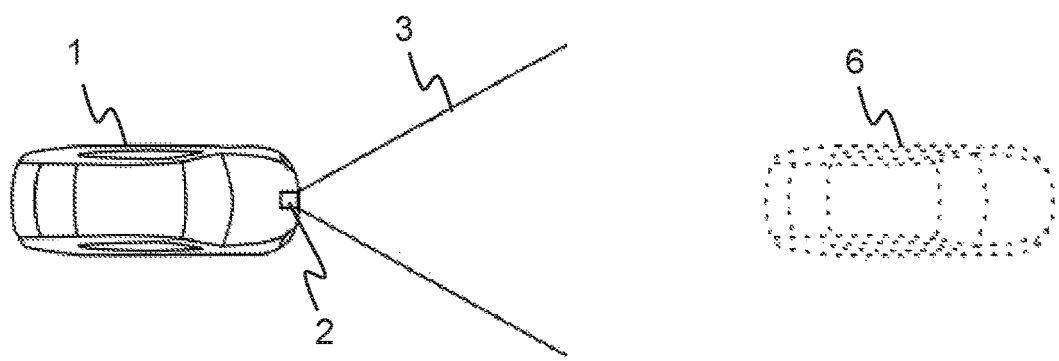
FIG. 2 shows a simplified schematic illustration of a traffic situation following the one in FIG. 1, in which the vehicle driving in front has an accident.

Reference numeral 1 in FIG. 1 describes an ego vehicle which is equipped with a driver assistance system which can execute or control functions such as, e.g., ACC (Adaptive Cruise Control) and/or EBA (Emergency Braking Assist) and/or LKA (Lane Keep Assist) and can capture the environment or the vehicle environment by means of suitable sensor technology and can preferably classify said environment by means of a classifier. For executing the functions, the driver assistance system comprises a central control unit (ECU—Electronic Control Unit, ADCU Assisted & Automated Driving Control Unit) which is not depicted in the figures. The classifier can be saved as an independent module or as a software application or algorithm on the central control unit of the driver assistance system. A radar sensor 2, in particular a far-range radar sensor, which has a forward-facing detection range 3, is provided as a sensor in the ego vehicle 1. Furthermore, in front of the ego vehicle 1, there is a further vehicle 4 driving in front of the ego vehicle 1, which is captured by the driver assistance system in the course of the object tracking by means of the radar sensor 2. On the basis of the sensor data of the radar sensor 2, the vehicle 4 can then be tracked by determining movement information (e.g., the speed or the acceleration of the vehicle 4) from the reflected detections or radar targets 5 of the vehicle 4. By means of the radar targets 5 and the associated movement information, the ego vehicle 1 can predict the following movement or the trajectory of the vehicle 4 and align or adapt the search area to expected detections associated with the vehicle 4, or, accordingly, the search window to the predicted object 6 depicted in FIG. 2. Furthermore, the vehicle 4 can then be classified by the classifier (e.g., as a car, truck, or in the event of an accident as a vehicle involved in an accident and the like). The classification can in addition also be included in the movement prediction. Consequently, the traffic situation can be established so that alterations or hazards can be reacted to in good time with braking and/or steering interventions or speed adjustments, by emitting warnings or the like.

Figure 3:
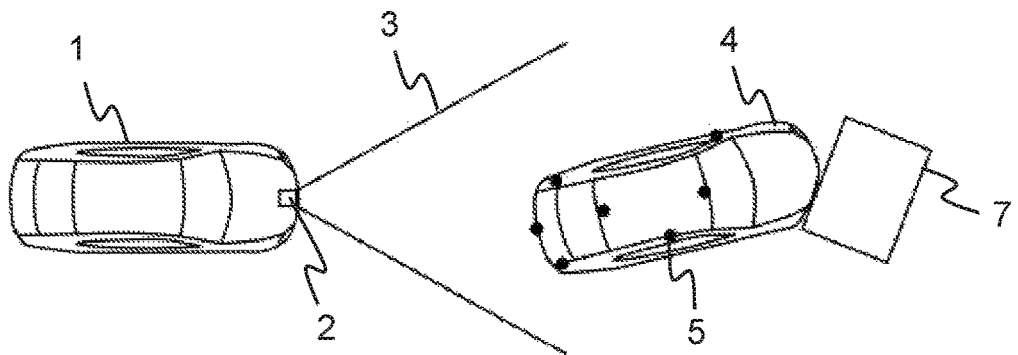
FIG. 3 shows a simplified schematic representation of the traffic situation from FIG. 2, with the predicted object position of the vehicle driving in front.
Figure 4:
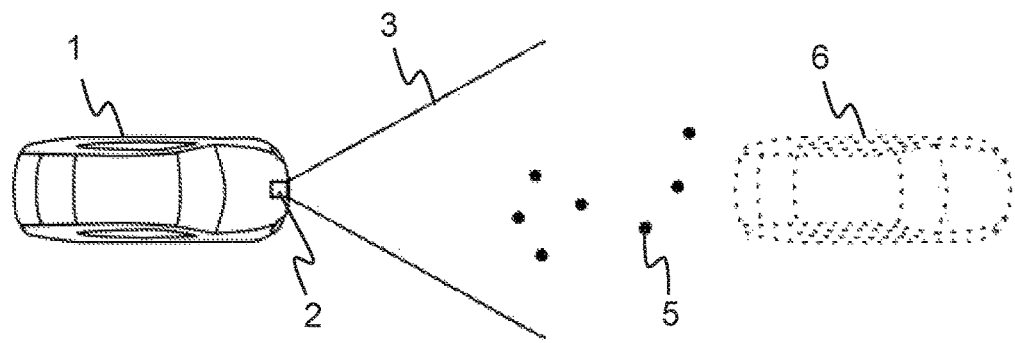
FIG. 4 shows a simplified schematic representation of the scan modes "near scan" and "far scan" of a far-range radar sensor.

In the following course of the traffic situation, the vehicle 2 driving in front has an accident due to an obstacle 7, according to FIG. 3. For example, the average acceleration here during the accident at a speed of approx. 50 km/h is approx. 200 m/s$^2$. For example, by contrast, the maximum absolute acceleration when starting is only about 3-7 m/s$^2$ and the maximum absolute acceleration during full braking is about −10 m/s$^2$. In addition, the duration from the impact up to standstill is around 72 ms and the change in speed per computing cycle (assumed cycle=70 ms) is around 7 m/s. Such variables can already lead to object losses or track breaks, as the search windows for detected objects or reported radar targets no longer lie within the expected range of a "normal journey", since both the speed and position change very quickly and very significantly in an accident situation. As a comparison, FIG. 4 depicts the expected object position or the predicted object 6 from FIG. 2 as well as the actually captured radar targets of the vehicle 4 which has had an accident from FIG. 3. These radar targets 5 now lie outside the search area (which is located here in the region of the predicted object 6). As a consequence, the original object or the vehicle driving in front 4 is lost. If the vehicle 4 is then recognized again, a new object with a very much lower speed or a stationary object is created. The information about the transition of the movement of the vehicle 4 from "moving" to "stationary" is lost.

In accordance with the method according to the present application, the vehicle 4 is marked as an object involved in an accident if the movement information thereof lies below a certain threshold or limit value. For example, if the absolute acceleration thereof is below −12 m/s$^2$, i.e., it can no longer be explained by full braking. This is effected in that, in a first step, it is recognized that a disproportionately large change in the speed of the assigned radar targets 5 exists between two successive measurement cycles in the case of an object or vehicle that has hitherto been stably tracked. However, the radar targets 5 must still lie within the normal search window for speeds. Alternatively, it is recognized that an object that has hitherto been stably tracked is not measured anymore without any obvious reason, i.e., no radar targets 5 are assigned to the object anymore in the current computing cycle. This can, e.g., be due to the fact that the speed of the radar targets 5 has already changed so significantly that they do not lie within the search window anymore. Should such a situation be recognized, the speed search window for this object is enlarged in such a way that radar targets 5 are also sought far outside the previous speed search window. The position of the radar targets 5 must lie in front of the object. Such measures can additionally reduce the probability of false positive events.

After the search window has been adapted, a search is accordingly made again for radar detections either in the current measurement cycle or beginning in the next measurement cycle, which radar detections correspond to the accident hypothesis of the object or a movement information pattern saved in a memory. If corresponding detections are found, they are assigned to the accident candidate. The acceleration a can be determined via the difference quotient on the basis of the speed v and time t, in that $$a=(v(n-1)-v(n))/\Delta t$$

This acceleration is then transferred or assigned to the object in order to be able to carry out a correct kinematic prediction for the next computing cycle, i.e., the new speed decreases accordingly and the position is displaced accordingly. Since a typical accident scenario usually only lasts around 70 ms, the entire accident scenario is over after just a few measurement cycles, possibly already after a single measurement cycle (with a cycle time of 70 ms), and the object involved in the accident comes to a standstill. Therefore, if possible, the widening of the search window should only be limited to a few measurement cycles. If no accident is confirmed within this time, the search window can be normalized again.

Figure 5:
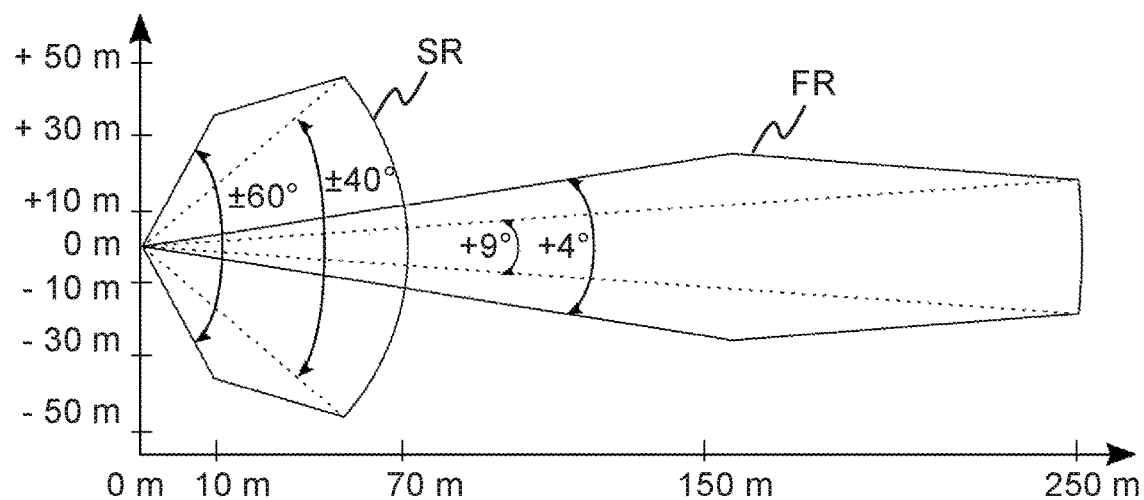
FIG. 5 shows a simplified schematic representation of a radar scan of a vehicle driving in front which is involved in an accident, which has been continuously captured and suddenly exhibits negative acceleration.

Furthermore, the method according to the present application can be applied to all, in particular, radar-based driver assistance systems, e.g., EBA (Emergency Brake Assist), LKA (Lane Keeping Assist), ACC (Adaptive Cruise Control) or the like, wherein the focus is however primarily on forward-facing sensor systems (front radar or long-range radar). Generic radar sensors can, for example, have different scan modes which can also comprise different aperture angles of the detection area in order to illuminate the near range (near scan SR) and/or the far range (far scan FR) for the respective application, as depicted in FIG. 5.

One embodiment of this is that the described traffic situation is detected in both radar scans (near-scan SR and far-scan FR), wherein the difference in speed between two successive measurements must be greater than a definable value for both scans independently of one another, preferably greater than 1 m/s. This activates the widening of the speed search window, e.g., to 7 m/s (approx. 1-2 m/s being standard) for the following five measurement cycles. A potential accident should in any case be completely terminated by the end of this cycle time. If radar detections are assigned to the accident candidate in the following measurement cycles, the acceleration can likewise be formed by means of the difference quotient. If the acceleration value exceeds e.g., an absolute value of $-12$ m/s$^2$, the object is classified as an object involved in an accident and the acceleration is assigned to the tracked object. Furthermore, the use of a second scan to check the plausibility is not absolutely necessary, but this can reduce the quantity of incorrectly triggered events or even prevent them.

Figure 6:
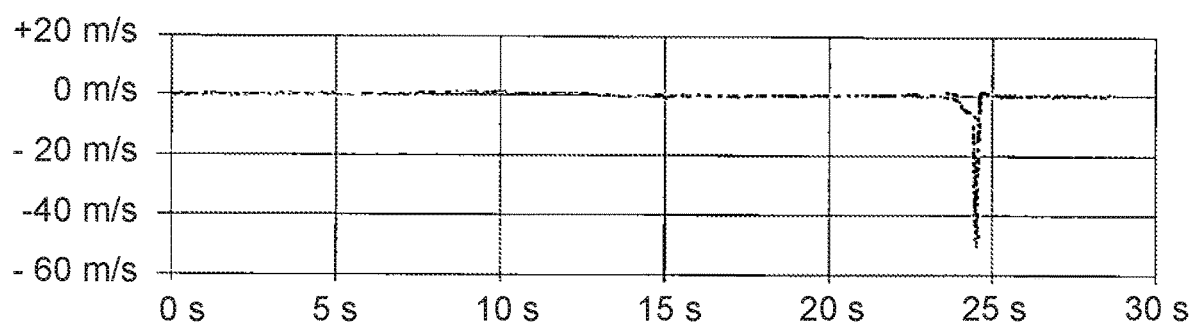
FIG. 6 shows a radar scan as a measurement result, in which the object or the vehicle driving in front involved in an accident, according to an embodiment.

In a practical way, this information can then be provided via an interface, e.g., to other vehicles or subscribers (Car-2-Car communication or Car-to-X communication), for example as data information, as a radar scan or the like. A radar scan (plotted as a function of acceleration a in m/s and time t in s) is depicted as a measurement result in FIG. 6, in which the object or the vehicle driving in front involved in an accident has been continuously captured and the acceleration of $-50$ m/s$^2$ occurs for a short period of time. In a practical way, the indicated parameters can also be varied in such a way that accidents are limited to a certain speed range, as a result of which the determination reliability can be improved even further.

The invention claimed is:

1. An method of tracking an object, the method comprising:
    emitting radar signals in successive measurement cycles in a first search window;
    receiving radar signals reflected by an object in the first search window;
    determining movement information about the object for object tracking on the basis of the radar signals;
    determining that a change in the movement information exceeds a limit value in the successive measurement cycles;
    determining a second search window wider in the first search window defined on the basis of the movement information in response to determining that the change in the movement information exceeds the limit value in the successive measurement cycles;
    emitting radar signals in a subsequent measurement cycle in the second search window; and
    tracking the object based on radar signals reflected by the object in the second search window.

2. The method according to claim 1, wherein the movement information comprises at least one of speed and acceleration of the object.

3. The method according to claim 2, wherein the movement information comprises the speed of the object, and
    wherein the method further comprises determining the acceleration of the object on the basis of a difference quotient of the speed of the object.

4. The method according to claim 1, further comprising saving movement information patterns for object tracking by means of which the object can be classified by aligning the movement information about the object with the movement information patterns.

5. The method according to claim 4, further comprising assigning, to the object radar targets captured in the second search window based on the movement information patterns.

6. The method according to claim 1, wherein the subsequent measurement cycle comprises a number of measurement cycles.

7. The method according to claim 1, further comprising transmitting the movement information about the object or classification of the object.

8. The method according to claim 7, wherein the classification is restricted to a region of the movement information.

9. The method according to claim 8, further comprising providing a plausibility check of at least one of the movement information and the classification of the object on the basis of multiple measurement cycles.

10. A driver assistance system comprising:
    a radar sensor configured to emit radar signals in successive measurement cycles in a first search window and receive radar signals being-reflected by an object in the first search window; and
    a processor configured to determine movement information about the object for object tracking on the basis of the radar signals, determining that a change in the movement information exceeds a limit value in the successive measurement cycles, determine a second search window wider than the first search window defined on the basis of the movement information in response to determining that the change in the movement information exceeds the limit value in the successive measurement cycles, control the radar sensor to emit radar signals in a subsequent measurement cycle in the second search window, and track the object based on radar signals reflected by the object in the second search window.

11. A non-transitory computer-readable recording medium having embodied thereon computer-readable codes which when executed by a processor of a radar sensor cause the radar sensor to execute an object tracking method, the method comprising:
    emitting radar signals in successive measurement cycles in a first search window;
    receiving said-radar signals being-reflected by an object in the first search window;
    determining movement information about the object for object tracking on the basis of the radar signals;

determining that a change in the movement information exceeds a limit value in the successive measurement cycles;

determining a second search window wider than the first search window defined on the basis of the movement information in response to determining that the change in the movement information exceeds the limit value in the successive measurement cycles;

emitting radar signals in a subsequent measurement cycle in the second search window; and tracking the object based on radar signals reflected by the object in the second search window.

* * * * *